: 3,388,004
Patented June 11, 1968

3,388,004
METHOD OF MAKING ELECTRODES USING HYDROPHOBIC POLYMER
Solomon Rosenblatt, Montclair, N.J., assignor, by mesne assignments, to Leesona Corporation, Cranston, R.I., a corporation of Massachusetts
No Drawing. Filed Sept. 30, 1965, Ser. No. 491,873
8 Claims. (Cl. 136—120)

This invention relates to a novel process for the construction of electrodes for use in an electrochemical device such as a fuel cell and to the electrodes made by said process. More particularly, the invention embraces a process for the construction of low thickness, lightweight electrodes having high electrochemical activity and utilizing only minor amounts of catalytic material. For convenience, hereinafter the process for preparing electrodes will be described with emphasis being placed on the use of the electrodes in a fuel cell. It will be apparent, however, that electrodes of the process can be employed in other electrochemical devices where similar considerations apply.

The advantages of lightweight electrodes for use in fuel cells have been recognized. These electrodes normally comprise a porous metal support coated with a catalytic material, such as a dispersion of noble metal black and hydrophobic polymer. The electrodes are extremely thin having low internal electrical resistance and, furthermore, take up only a very small amount of space permitting the construction of highly compact cells having a high energy to volume and energy to weight ratio. It has been found, however, that it is difficult to provide electrodes which have the catalytic metal particles and hydrophobic polymer particles uniformly distributed throughout the electrode structure unless relatively large amounts of catalytic metal are employed. Since the catalytic metal is expensive, it is desirable to employ as light a load of catalyst in the electrode as possible. Further, it is difficult to obtain reproducibility in the electrodes when employing heavy loads of catalyst.

Accordingly, it is an object of the present invention to provide an improved process for the construction of thin lightweight electrodes which have high electrochemical activity and which employ only limited amounts of catalytic metal.

It is another object of this invention to provide improved thin, lightweight electrodes having high electrochemical activity with the catalyst being uniformly distributed in the electrode.

It is another object of this invention to provide an improved process for the construction of thin lightweight electrodes having high electrochemical activity with the process being highly reproducible.

These and other objects of the invention will be more readily apparent from the following detailed description with particular emphasis being placed on the working example.

The aforesaid objects of the invention are accomplished by applying an admixture of an electrochemically active metal and hydrophobic polymer to at least one major surface of a porous metal support as a gel-like solution or dispersion. According to the invention, an intimate admixture is made of the electrochemically active catalyst and a suspension of finely divided hydrophobic polymer, with the suspension or dispersion being thickened to provide a stable gel-like mass by the incorporation of a cohesion-adhesion surface active agent. The gel-like admixture is applied to a metal support by any of numerous means such as spreading with a flat knife-like surface, a doctor's blade, or by brushing the admixture upon the support. It may be desirable to apply a light pressure or roll the gel-like mass into the metal support. Thereafter, the electrode is heated at temperatures elevated sufficiently to sinter the polymer particles to each other and to the metal support and to burn out the cohesion-adhesion surface active agent. Electrodes constructed according to this embodiment have excellent flexibility and the active material adheres tightly to the metal support. More critically, the electrode has excellent electrochemical activity and will provide a high current density at a given voltage. It has been found that a load of metal catalyst on a support structure of approximately 1 mg./cm.$^2$ will provide a current density equal to a load of metal catalyst on a support structure of 10 mg./cm.$^2$ when the catalyst is applied without the use of a cohesion-adhesion agent. The reason for the improvement is not completely understood, but it is theorized that the gelling agent permits a more uniform distribution of the catalyst load over the electrode, and further, the burning out of the gelling agent apparently increases the reactive surface area of the electrode.

According to the present invention, the metal support can be a metal screen, expanded metal, porous sinter, metal felt or mesh. It is essential that the structure be electrically conductive and able to withstand the corrosive environment of a fuel cell. Suitable metal supports which are preferably from about 0.5 to 1.0 millimeter thick, having a high porosity, i.e., from 35–90 percent, are composed of nickel, copper, iron, titanium, tantalum, zirconium, gold, silver, and alloys thereof. Primarily from the standpoint of their exceptional resistance to the corrosive environments of the cell and their relative inexpensiveness, nickel, titanium, and tantalum supports are preferred.

The polymer which is dispersed with the catalytic metal which is applied to the metal support must be relatively hydrophobic. Exemplary polymers include polytetrafluoroethylene, polytrifluorochloroethylene, polyvinyl fluoride, polyvinylidene fluoride, polytrifluoroethylene, and copolymers thereof. However, because of its exceptional hydrophobicity, as well as its resistance to heat and the corrosive environment of the electrolyte, polytetrafluoroethylene is preferred.

The electrochemically active metal which is to be applied to the metal support as a dispersion with the hydrophobic polymer can be any of various metals which will favorably influence an electrochemical reaction. Such metals include columbium, nickel, iron, gold, copper, palladium, platinum, rhodium, ruthenium, osmium, and iridium and alloys thereof. However, because of their excellent properties insofar as favorably influencing an electrochemical reaction, the Group VIII metals of Mendelyeev's Periodic Table are preferred.

In the preparation of the admixture of the electrochemically active metal and hydrophobic polymer, the suspending or solvent medium will vary depending upon the particular polymer selected and the cohesion-adhesion gelling agent. Thus, although water is the preferred suspending or solvent medium, it can be replaced with other fluid mediums such as xylene, ethylacetate, ethylacetoacetate, methyl isobutyl ketone, methyl ethyl ketone, and the like. The cohesion-adhesion agent can be any of numerous materials including the natural vegetable gums such as gum arabic, gum dammar, gum tragacanth, gum karaya, locust bean gum, Irish moss, pectin, gelatin, gelatinized starch, and agaragar gum. Synthetic materials such as carboxymethyl cellulose, sodium carboxymethyl cellulose, sodium carboxyethyl cellulose, hydroxyethyl cellulose, hydroxymethyl cellulose, polyvinyl alcohol, etc., are also suitable materials. Additional materials capable of providing thixotropic characteristics and which are combustible at a temperature at, or somewhat below the fusing point of the hydrophobic polymer can be selected for the preparation of the lightweight electrode.

The ratio of polymer to catalytic metal and/or gelling agent in the dispersion is not critical provided a gel is formed. Normally, the desideratum is to have as light a load of the catalytic metal as possible, but with a high surface area exposed for electrochemical reaction. The present invention, as noted hereinbefore, permits the use of considerably reduced loading of catalytic metal to obtain an equivalent result. In the usual construction, the catalytic metal-polymer admixture will contain from about 90 to 55 percent metal and from about 10 to 45 percent polymer on a weight basis. The optimum percentage is about from 65 to 90 percent metal and 35 to 10 percent polymer on a weight basis. Such ratios of polymer to metal are readily gelled or rendered thixotropic by employing from 0.5 to 15 percent cohesion-adhesion agent on a weight basis. It has been found that the process can be enhanced if minor amounts of salts of complex polysaccharides, such as those derived principally from D-galactonic acid, are employed with the cohesion-adhesion gelling agent. Improved stability of the suspension is obtained, apparently as a result of the surface charge on the salts. With the addition of such salts, very stable paste suspensions in high solid aqueous systems are possible.

Although the heating of the metal support having the gelled metal-polymer admixture applied thereon at elevated temperatures is essential to sinter the polymer particles to obtain bonding and to burn out the gelling agent, the heating temperature can vary over a substantial range. Thus, normally the hydrophobic polymers will sinter at temperatures of from about 180 to 320° C. for periods varying from 5 to 45 minutes. It is necessary that the cohesion-adhesion surfaces active agent selected will be combusted at this temperature. Inasmuch as there is a direct relationship between time and temperature, within limits, if the temperature is increased, the time of the sintering operation can be reduced. It has been found that greater reproducibility is obtained if the temperature is maintained between about 220 to 300° C. for periods of about 10 to 35 minutes. The sintering operation can be carried out in conventional draft furnaces, in an inert atmosphere or in an atmosphere of air.

The electrodes prepared by the process of the present invention can be employed in fuel cells and other electrochemical devices employing any of the prior art electrolytes such as the alkali metal hydroxides and acid electrolytes such as sulfuric and phosphoric acid. It is only essential that the electrolyte remain invariant or substantially invariant under the operating conditions of the cell. Additionally, the electrodes can be employed with various fuels including hydrogen, the hydrocarbons and ammonia. By properly selecting the catalytic metal, enhanced results can be obtained with any particular fuel. Additionally, by judiciously selecting the catalytic metal, a good cathode can be obtained for operation on air.

Having described the invention in general terms, the following example is set forth to more particularly illustrate the invention. Parts are by weight unless otherwise specified.

EXAMPLE

A 25 percent solids solution of gum tragacanth in water containing platinum black and polytetrafluoroethylene (20 percent polytetrafluoroethylene and 80 percent platinum black on a weight basis) was mixed to a paste consistency with light agitation and spread upon one surface of a 50 mesh nickel screen, which screen had a weight of 14.5 mg./cm.$^2$. The structure was dried at 80° C. for ten minutes and thereafter sintered at 600° F. in an inert atmosphere for four minutes to obtain a mechanically stable lace-type geometry of catalyst bonded to the screen. The electrode had good mechanical stability and the active metal adhered well to the screen.

The electrode so formed was tested in a fuel cell as an anode and fed with pure hydrogen at 25° C. The electrolyte was 5 normal sulfuric acid. It was found that better electrochemical performance was obtained at a 1 mg./cm.$^2$ platinum loading than with conventional lightweight electrodes at 10 mg./cm.$^2$ platinum loading.

In the above example, the metal support screen can be replaced with other metal supports such as copper, silver, gold, tantalum, iron, and platinum. Additionally, the metal of the catalytic layer can be replaced by other electrochemically active materials including nickel, copper, gold, silver, palladium, ruthenium, and rhodium. The hydrophobic polymer can be replaced with other polymers such as polystyrene, polyethylene, polytrifluorochloroethylene, polyvinylidene fluoride, and copolymers thereof. The cohesion-adhesion agent can be replaced by other materials including carboxymethyl cellulose, sodium carboxymethyl cellulose, sodium carboxyethyl cellulose, hydroxyethyl cellulose, hydroxymethyl cellulose, polyvinyl alcohol, gum arabic, gum dammar, pectin, etc. Furthermore, a thin film of hydrophobic polymer, or the like can be applied to one surface of the electrode and that surface placed in contact with the reactant gas when the electrode is deposed in a fuel cell to obtain improved wetting characteristics.

As will be apparent to one skilled in the art, the illustrative example is only set forth as being a preferred embodiment of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described primarily with reference to fuel cells, it is possible to employ the aforesaid electrodes in other electrochemical devices.

It is claimed:

1. The method of constructing a lightweight electrode comprising the steps of forming a uniform gel-like admixture of a catalytically active metal, a hydrophobic polymer and a gel-forming cohesion-adhesion surface active agent, applying the admixture to a porous metal support, and heating the resultant structure at a temperature elevated sufficiently to bond the hydrophobic polymer to said support and to consume the surface active agent.

2. The method of claim 1 wherein the gel-like admixture is formed in an aqueous medium.

3. The method of claim 2 wherein the electrochemically active metal is platinum.

4. The method of claim 3 wherein the hydrophobic polymer is polytetrafluoroethylene.

5. The method of claim 4 wherein the platinum is present on the electrode at a load from 1 mg./cm.$^2$ to 10 mg./cm.$^2$.

6. The method of claim 1 wherein the cohesion-adhesion surface active agent is gum tragacanth.

7. The method of claim 6 wherein minor amounts of a salt of complex polysaccharide is present in the admixture.

8. The method of claim 1 wherein the gel-like admixture of active metal, hydrophobic polymer and gel-forming cohesion-adhesion surface active agent is applied to the metal support by brushing and the admixture thereafter pressed into said support.

References Cited

UNITED STATES PATENTS 3,113,048  12/1963  Thompson _____ 136—86

ALLEN B. CURTIS, *Primary Examiner.*

WINSTON A. DOUGLAS, *Examiner.*

N. P. BULLOCH, *Assistant Examiner.*